United States Patent Office 3,803,129
Patented Apr. 9, 1974

3,803,129
1,5-DIHYDRO-3-ALKOXY-5-PHENYL-2H-
1,4-BENZODIAZEPIN-2-ONES
Ronald J. McCaully, Malvern, and Abraham Nudelman,
Bala Cynwyd, Pa., assignors to American Home Products Corporation, New York, N.Y.
No Drawing. Filed Aug. 10, 1972, Ser. No. 279,426
Int. Cl. C07d 53/06
U.S. Cl. 260—239.3 D                6 Claims

ABSTRACT OF THE DISCLOSURE

This invention is directed toward central nervous system depressants of the formula:

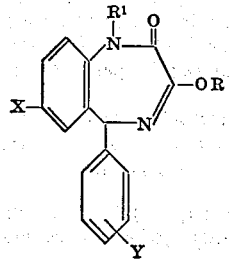

in which

R is selected from the group consisting of lower alkyl and ar(lower)alkyl;
$R^1$ is selected from the group consisting of hydrogen, lower alkyl, ar(lower)alkyl, (lower)alkoxy(lower)alkyl and (lower)dialkylamino(lower)alkyl;
X is selected from the group consisting of halogen, cyano, trifluoromethyl, nitro and lower alkylthio; and
Y is selected from the group consisting of hydrogen, halogen, trifluoromethyl, nitro and lower alkylthio radicals. This invention also provides methods for the preparation of the central nervous system depressant compounds and their administration as well as the compositions for administration which contain the active compounds of this invention.

BACKGROUND OF THE INVENTION 1,5-dihydro-1,4-benzodiazepine derivatives devoid of substitution in the 3-position are disclosed in J. Med. Chem., vol. 11, pp. 172–174 (1968).

DESCRIPTION OF THE INVENTION

This invention relates to the physiologically active 1,5-dihydro-3-alkoxy - 5 - phenyl-2H-1,4-benzodiazepin-2-one compound series. The chemical structure of these compounds may be depicted by the following formula:

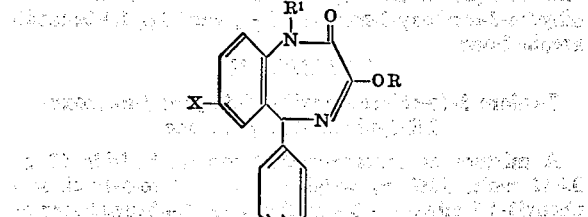

in which

R is selected from the group consisting of lower alkyl and ar(lower)alkyl;
$R^1$ is selected from the group consisting of hydrogen, lower alkyl, ar(lower)alkyl, (lower)alkoxy (lower) alkyl and lower dialkylamino (lower) alkyl;

X is selected from the group consisting of halogen, cyano, trifluoromethyl, nitro and lower alkylthio; and
Y is selected from the group consisting of hydrogen, halogen, trifluoromethyl, nitro and lower alkylthio radicals and the pharmaceutically acceptable N-acid addition salts thereof.

The hydrated forms of the depicted compounds are also considered to be within the scope of the invention, the anhydrous form of each compound being readily prepared by drying the initially formed product.

The term "lower" employed throughout this application to modify the expressions alkyl, alkoxy and the like, is intended to include straight and branched chain groups derived from the alkane series which contain from 1 to about 7 carbon atoms, such as methyl, ethyl, i-propyl, n-propyl, n-hexyl, and the corresponding alkoxy radicals. The terms halogen and halo are used to include atoms selected from the group consisting of chlorine, fluorine, bromine and iodine. The term aralkyl is used to designate those radicals which are monovalent, aromatic, hydrocarbon groups in which the single valence bond belongs to the alkyl chain and which contain from about 7 to 9 carbon atoms, such as benzyl and phenethyl. The expression, pharmaceutically acceptable acid addition salts, is used to include those non-toxic acid addition salts which may be formed with either organic or inorganic acids such as hydrochloric, hydrobromic, sulfuric, phosphoric, methane sulfonic, nitric, p-toluene sulfonic, acetic, citric, maleic, succinic acid, and the like.

The compounds of this invention may be prepared by the following reaction schemes;

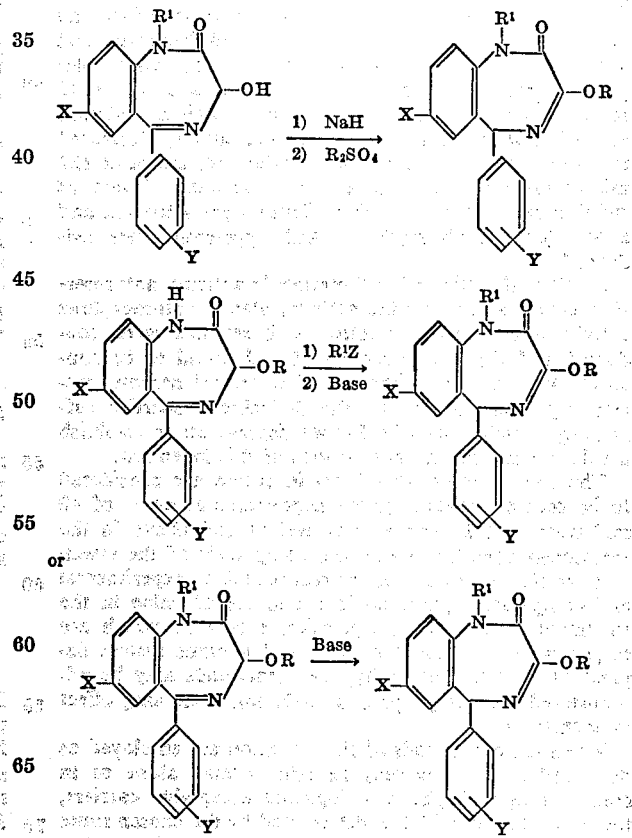

The first procedure being preferred when R is a lower alkyl group. In these reaction schemes, the groups R, $R^1$, X and Y have the meanings defined above. The group Z may be chlorine, bromine or iodine. The base employed in the second and third reaction schemes may be any strong base such as sodium hydride, an alkali metal amide such as sodium amide, an alkali metal hydroxide such as potassium hydroxide, an alkali metal alkoxide such as potassium tertiary butoxide or sodium methoxide, and the like. The isomerization from a 1,3-dihydrodiazepin-2-one to the 1,5-dihydro isomer is conducted in an inert organic solvent such as the tetrahydrofuran, dimethylformamide, and the like, at a temperature from room temperature to about 125° C. It is preferred to conduct the reaction at the reflux temperature of the reaction medium employing anhydrous non-reactive organic solvents at as low a temperature as is permissible. Generally, the reaction goes satisfactorily to completion in a relatively short time ranging from about 0.5 to 16 hours.

The compounds of this invention are physiologically active central nervous system depressants. In the pharmacological evaluation of the biological activity of the compounds of this invention, the in vivo effects were tested as follows: The compounds tested were administered orally to 3 mice (14 to 24 grams body weight) at doses ranging from 0.127 milligram per kilogram body weight to 400 milligrams per kilogram body weight. The animals were watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) were noted. The animals were tested for changes in reflexes (i.e., flexor, extensor) and were rated by use of a pole climb and inclined screen for the presence of sedation-ataxia. The "Eddy Hot-Plate Method" (Eddy et al., J. Pharmacol. Exper. Therap. 107,385 (1953) was used to test for analgesia. The experiment was terminated by subjecting each animal to a maximal electro-shock to test for anti-convulsant activity. Following this procedure, the compounds of this invention demonstrated depressant and anti-convulsant activity with a response of general depression recognized in decreased motor activity at 40 milligrams per kilogram and above, as well as sedation at 127 milligrams per kilogram and above, decreased respiration at 127 milligrams per kilogram, ataxia at 127 milligrams per kilogram, a certain amount of loss of righting reflex, ptosis at 40 milligrams per kilogram and above, while both mydriasis and hyperemia were evidenced.

Additional testing of anti-metrazole activity, anti-reserpine ptosis, anti-tremorine activity, ataxia, anti-morphine activity and maximal electro-shock seizures were conducted and the results correlated and found to be consistent with the establishment of a central nervous system depressant possessing the desirable properties sufficiently correlatable with known depressants to establish a valuable use for the compounds of this invention.

Thus, the compounds of this invention are considered to be central nervous system depressants at doses of 40 milligrams per kilogram body weight and above in the mentioned host. Therefore, the compounds of the invention are physiologically active compounds in experimental and comparative pharmacology and are of value in the treatment of mammals, e.g. mice, rats, etc., which are responsive to treatment with central nervous system depressant agents. Specifically, the compounds may be administered for the purpose of inducing a calming effect in mammals.

When the compounds of the invention are employed as described above they may be administered alone or in combination with pharmacologically acceptable carriers, the proportion of which is determined by the chosen route of administration and standard pharmaceutical practice. For example, they may be administered orally in tablet or capsule form with conventional flavors, diluents, lubricants, disintegrators or binding agents as may be required. They may be administered orally in the form of a solution or they may be injected parenterally. For parenteral administration they may be used in the form of a sterile solution containing other solutes, for example, enough saline or glucose to make the solution isotonic. It is most advantageous to provide the compound as a dry powder in a suitable container so that it may be admixed with a suitable aqueous vehicle prior to administration.

A suitable tablet formulation may be prepared with a unit dosage amount of the desired compound, for example, 7-chloro - 5 - (o-chlorophenyl)-1,5-dihydro-3-methoxy-1-methyl-2$\underline{H}$-1,4-benzodiazepin-2-one, admixed with microcrystalline cellulose, N.F., magnesium stearate U.S.P. and U.S.P. lactose as the filler. Injectable formulations are prepared by combining a water soluble salt such as 7-choro-5-(o-chlorophenyl) - 1 - (2-diethylaminoethyl)-1,5-dihydro-3-methoxy - 2$\underline{H}$ - 1,4 - benzodiazepin-2-one, hydrochloride with lactose, preferably in a sealed glass ampoule. The vehicle in which the salt is dissolved prior to parenteral application may "desirably" be sterile water containing 1 percent benzyl alcohol and 0.6 percent sodium acetate/acetic acid buffer.

The following examples are added to illustrate but not necessarily limit the scope of the invention.

EXAMPLE I 7-chloro-5-(o-chlorophenyl)-1,5-dihydro-3-methoxy-1-methyl-2$\underline{H}$-1,4-benzodiazepin-2-one 7-chloro-5-(o-chlorophenyl)-3-hydroxy - 1,3 - dihydro-2$\underline{H}$-1,4-benzodiazepin-2-one (11.0 g., 30 millimole) was added portionwise to a stirred slurry of 2.88 g. (60 millimole) of sodium hydride (50% dispersion in mineral oil previously washed with pentane) in 100 ml. of dimethylformamide. The thick solution was diluted with 100 ml. of 1,2-dimethoxyethane, stirred at 27° C. for 45 minutes, and treated dropwise over 1 hour with a solution of 7.56 g. (60 millimoles) of dimethyl sulfate in 10 ml. of 1,2-dimethoxy ethane. After the reaction was stirred for 1.5 hr. at 27° C., it was poured over 250 g. of ice that had been acidified with 7.0 g. of acetic acid. The addition of ca. 10 ml. of 1,2-dimethoxy ethane caused the gummy residue to solidify to a filterable solid. Recrystallization gave 5.03 g. of product (M.P. 171–175° C. cloudy to 210° C.) containing a small amount of impurity. Recrystallization from cyclohexane afforded 3.17 g. of 7-chloro-5-(o-chlorophenyl)-1,5-dihydro - 3 - methoxy - 1 - methyl-2$\underline{H}$-1,4-benzodiazepin-2-one, M.P. 179–180° C.; IR (KBr) 6.10 with shoulder at 6.03 (C=O and C=N); NMR (CDCl$_3$) $\delta$ 3.65 (s., 3), 3.84 (s., 3), 5.91 (s., 1), 6.43 (broad s., 1), 7.2–7.6 (m., 5), 8.25 (m., 1).

Elemental analysis: Calc'd for $C_{17}H_{14}Cl_2N_2O_2$ (percent): C, 58.47; H, 4.04; N, 8.02. Found (percent): C, 58.75; H, 4.23; N, 8.25.

Following the procedure of the preceding paragraph, react 7-chloro - 1,3 - dihydro - 3 - hydroxy-1-methyl-5-phenyl-2$\underline{H}$-1,4-benzodiazepin-2-one with sodium hydride and subsequently dimethyl sulfate to produce 7-chloro-1,5-dihydro-3-methoxy-1-methyl - 5 - phenyl-2$\underline{H}$-1,4-benzodiazepin-2-one.

EXAMPLE II 7-chloro-5-(o-chlorophenyl)-1,5-dihydro-3-methoxy-2H-1,4-benzodiazepin-2-one A mixture of pentane-washed sodium hydride (2 g., 0.042 mole, 50% by weight) and 7-chloro-5-(o-chlorophenyl)-1,3-dihydro - 3 - methoxy-2$\underline{H}$-1,4-benzodiazepin-2-one (7.1 g., 0.02 mole) in 100 ml. of anhydrous dimethyl formamide was heated for 16 hours at 75° C. The reaction mixture was poured into water, neutralized with 3 N hydrochloric acid and extracted with chloroform. The chloroform solution was dried (magnesium sulfate), and upon evaporation an oil was obtained which was recrystallized from 300 ml. of ethanol. It was necessary to add some tetrahydrofuran to dissolve all the solid. Upon concentrating the solution to 250 ml. a solid was obtained (5.3 g., 75% yield), M.P. 282–284° C., NMR (DCCl₃) p.p.m. (δ): 3.85 (s., 3); 5.95 (s., 1); 6.41 (broad s., 1); 7.3–8.1 (m., 5); 8.3–8.6 (m., 1).

Elemental analysis: Calc'd for $C_{16}H_{12}Cl_2N_2O_2$ (percent): C, 57.33; H, 3.61; N, 8.38. Found (percent): C, 57.17; H, 3.59; N, 8.27.

Following the procedure of Examples 1 and 2, react 7-chloro - 1,3 - dihydro-3-hydroxy-5-phenyl-2H-1,4-benzodiazepin-2-one with dimethyl sulfate in 1,2-dimethoxyethane to form the 3-methoxy group followed by base isomerization with sodium hydride in anhydrous dimethyl formamide to obtain 7-chloro-1,5-dihydro-3-methoxy-5-phenyl-2H-1,4-benzodiazepin-2-one.

EXAMPLE III 7-chloro-5-(o-chlorophenyl)-1-(2-diethylaminoethyl)-1,5-dihydro-3-methoxy-2H-1,4-benzodiazepin-2-one . To a solution of 7-chloro-5-(o-chlorophenyl)-1,3-dihydro-3-methoxy-2H-1,4-benzodiazepin-2-one (134 g., 0.4 mole) in 3 liters of tetrahydrofuran was added a solution of sodium iodide (120 g., 0.8 mole) and diethylaminoethyl chloride, hydrochloride (85 g., 0.5 mole) in 400 ml. of water. To the dark orange solution thus obtained, potassium hydroxide (79 g., 1.2 mole of 85% by weight) was added. The mixture was stirred at room temperature for 16 hours and was then concentrated by flash evaporation to 1000 ml. To the mixture 300 ml. of saturated sodium chloride was added followed by extraction with a total 150 ml. of diethyl ether in two portions, the ethereal solution was dried over magnesium sulfate and was added in portions to 2 liters of boiling cyclohexane. A cloudy solution was obtained which was concentrated to 2000 ml. and was then filtered. The cloudy solution obtained was further concentrated to 600 ml. upon which a clear solution was obtained. Upon cooling a solid was obtained (78.5 g., 46% yield) which was recrystallized from cyclohexane, M.P. 148–150° C.; NMR (DCCl₃), p.p.m. (δ) 1.0 (t., 6); 2.65 (q., 4); 2.8 (m., 2); 3.85 (s., 3); 4–4.5 (m., 2); 6.02 (s., 1); 6.66 (s., 1); 7.1–7.6 (m., 5); 8.2–8.4 (m., 1).

Elemental analysis: Calc'd for $C_{22}H_{25}Cl_2N_3O_2$ (percent): C, 60.83; H, 5.80; N, 9.67; Cl, 16.32. Found (percent): C, 61.11; H, 5.77; N, 9.50; Cl, 16.51.

What is claimed is:

1. A compound selected from the group consisting of:

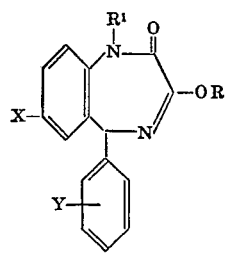

in which

R is a member selected from the group consisting of lower alkyl and an ar(lower)alkyl hydrocarbon containing 7 to 9 atoms, inclusive;

R¹ is a member selected from the group consisting of hydrogen, lower alkyl, an ar(lower)alkyl hydrocarbon containing from 7 to 9 carbon atoms, inclusive; lower alkoxy(lower)alkyl and di(lower)alkylamino(lower)alkyl;

X is a member selected from the group consisting of halo, cyano, trifluoromethyl, nitro and lower alkylthio;

Y is a member selected from the group consisting of hydrogen, halo, trifluoromethyl, nitro and lower alkylthio;

and the pharmaceutically acceptable N-acid addition salts thereof.

2. A compound of claim 1 of the formula:

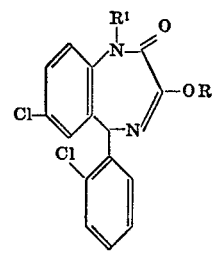

in which

R is a member selected from the group consisting of lower alkyl and an ar(lower)alkyl hydrocarbon containing 7 to 9 carbon atoms, inclusive;

R¹ is a member selected from the group consisting of hydrogen, lower alkyl, and di(lower)alkylamino-(lower)alkyl;

and the pharmaceutically acceptable N-acid addition salts thereof.

3. A compound of claim 1 of the formula:

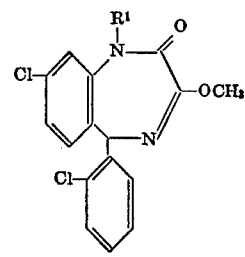

in which

R¹ is a member selected from the group consisting of hydrogen, lower alkyl and 2-diethylaminoethyl radicals; and pharmaceutically acceptable N-acid salts thereof.

4. A compound as defined in claim 1 which is 7-chloro-5-(o-chlorophenyl)-1,5-dihydro-3-methoxy-2H-1,4-benzodiazepin-2-one.

5. A compound as defined in claim 1 which is 7-chloro-5-(o-chlorophenyl) - 1,5 - dihydro-3-methoxy-1-methyl-2H-1,4-benzodiazepin-2-one.

6. A compound of claim 1 which is 7-chloro-5-(o-chlorophenyl)-1-(2-diethylaminoethyl) - 1,5 - dihydro-3-methoxy-2H-1,4-benzodiazepin-2-one.

References Cited

UNITED STATES PATENTS 3,706,734   12/1972   Fryer et al. _____ 260—239.3 D

HENRY R. JILES, Primary Examiner

R. T. BOND, Assistant Examiner

U.S. Cl. X.R.

424—244

UNITED STATES PATENT OFFICE
CERTIFICATE OF CORRECTION

Patent No. 3,803,129              Dated  April 9, 1974

Inventor(s) Ronald J. McCaully and Abraham Nudelman

It is certified that error appears in the above-identified patent and that said Letters Patent are hereby corrected as shown below:

Claim 3, col. 6, line 40, in the structural formula, correct the position of the "Cl-" group thusly --

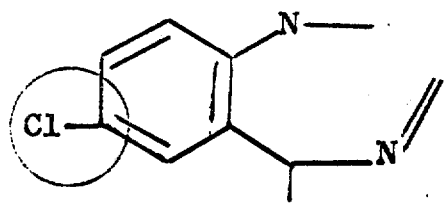

Signed and sealed this 11th day of February 1975.

(SEAL)
Attest:

RUTH C. MASON
Attesting Officer

C. MARSHALL DANN
Commissioner of Patents
and Trademarks